Nov. 29, 1949 G. W. BORKLAND Re. 23,171
APPARATUS FOR AND METHOD OF FORMING SHEET MATERIAL
Original Filed May 25, 1944
Fig. 1.
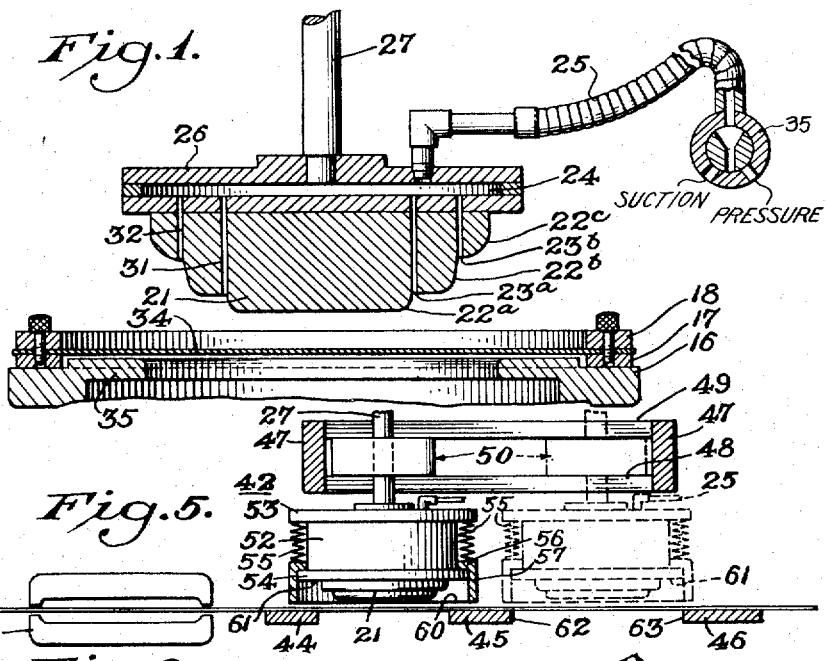
Fig. 5.
Fig. 2.
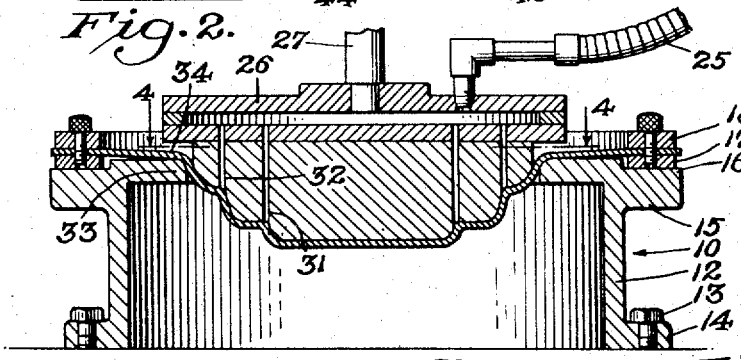
Fig. 4.
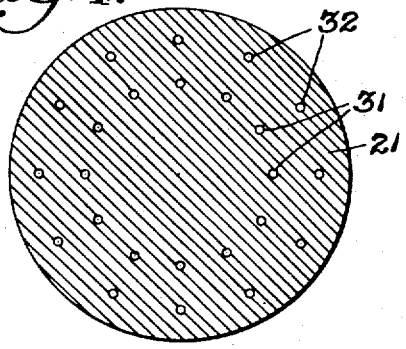
Fig. 3.
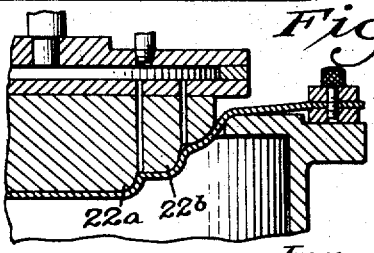
Inventor
Gustave W. Borkland
By
Thiess, Olson & Mecklenburger
Attorneys.

Reissued Nov. 29, 1949

Re. 23,171

UNITED STATES PATENT OFFICE 23,171

APPARATUS FOR AND METHOD OF FORMING SHEET MATERIAL

Gustave W. Borkland, Marion, Ind.

Original No. 2,442,338, dated June 1, 1948, Serial No. 537,353, May 25, 1944. Application for reissue October 4, 1949, Serial No. 119,431

8 Claims. (Cl. 18—19)

This invention relates to the forming of hollow articles from sheets or strips of plastic material and more particularly to the forming of such articles from material of this kind by the use of mechanical pressure and suction, the mechanical pressure being employed first in a preliminary partial forming of the article and the suction coming into play thereafter for the completion of the forming.

One of the objects of the invention is the provision of improved apparatus for forming sheet-like plastic material comprising a single forming punch, means for maintaining the sheet or strip material in a predetermined position during the forming operation, and suction means contributing to the forming operation.

Another object of my invention is to provide an improved method and apparatus for forming cup-shaped articles of plastic material having protuberant zones interspaced with reentrant zones by the use of a single forming punch combinedly operating with air suction.

Inasmuch as it is difficult to make perfectly mating male and female dies, especially where thin materials are to be formed, there is great danger in forming thin materials, if perfect mating is not obtained, of producing an article of varying wall thickness, which, upon cooling of the article, or in its use, may result in cracking. Furthermore, the making of both male and female dies is expensive. Therefore, a further aim is to provide an apparatus and method for the purpose described which will eliminate the necessity of female dies and the consequent expense thereof.

Further objects and advantages of the invention will be apparent from the description and claims.

In the drawings, in which my invention is illustrated,

Figure 1 is an axial sectional view showing the forming punch in position with respect to the sheet to be formed.

Fig. 2 is a view similar to Fig. 1 showing the position of the parts just prior to the final phase of movement of the forming punch;

Fig. 3 is a fragmentary axial sectional view showing an intermediate position of the forming punch;

Fig. 4 is a cross-section on the line 4—4 of Fig. 2, and

Fig. 5 is a schematic representation of a continuous production system embodying the invention.

The article to be formed may be circular, rectangular or otherwise in outline, but by way of illustration the apparatus will be described as used for a circular molded article.

Referring now to the drawings in detail, there is shown a circular platen member 10 supported in any suitable manner on the bed 11 of a molding press of a common type (not shown) and provided with a spacing portion 12 to allow movement of the forming die therein. Bolts 13 may be provided to maintain the platen member 10 in position on the bed 11, a flange 14 being provided on member 10 for that purpose.

Extending around the periphery of member 10 is the flange 15 serving to support on its upper face 16 the lower of a pair of clamping members 17 and 18, as shown, each consisting of a ring adapted to be maintained in clamping engagement with the blank by thumb screws, clamps, or equivalent readily detachable holding means.

The movable forming punch 21 comprises a shaping surface formed to correspond with the desired contour of the inner surface of the article to be molded, which in the present case is illustrated as of generally cupped form having protuberant zones 22*a*, 22*b* and 22*c* interspersed with re-entrant zones 23*a* and 23*b*. At this juncture it will be understood that I do not intend to limit the invention to the number of protuberant zones and re-entrant zones illustrated, but that they may be more or less in number depending upon the shape of the article to be formed. At its upper end the forming punch 21 includes a chamber 24 of generally cylindrical shape, communicating with a source of vacuum (not shown) through a flexible tube 25. The upper portion 26 of the forming punch 21 receives the piston rod 27 of the press by means of which intermittent reciprocating motion is imparted to the forming punch.

Serving to connect chamber 24 with the reentrant zones 23*a* and 23*b* is a plurality of passages, as shown, comprising two concentric groups of apertures 31 and 32 (Fig. 4), although if preferred the passages between chamber 24 and zones 23*a* and 23*b* may be annular and substantially continuous about the periphery, i. e., interrupted only by ribs to maintain the integral nature of forming punch 21.

Extending around the periphery of member 10 is the inner flange 33, preferably rounded at its inner and upper corner 34 for a purpose to appear later.

Operation is as follows: The sheet or blank of plastic material is placed between clamping rings 17 and 18, as shown, to maintain the position of the blank during the forming and stripping operation. If the nature of the material is such that ductility must be imparted by heating or otherwise, such part of the process may be performed prior to or after the time the blank is brought into position. Necessarily, the ductilizing of the blank must be sufficient to render the same formable but not excessively to cause it to sag under gravity.

Following any desired ductilizing of the blank, the forming punch 21 begins to move downward against the material, as shown in Fig. 3, and an air suction is applied through tube 25, a chamber 24 and passages 31 and 32. Depending upon the particular final shape of the article, the suction may be applied continuously during the entire downward movement of the forming punch; during a portion of said movement to terminate at the same time as the forming punch reaches its lowest position, or it may be applied during a portion of the downward movement of the forming punch beginning after the forming punch begins to move and terminating before the forming punch reaches its lowest position. Any such timing of the application of suction with respect to the cycle of movement of the forming punch may be by means of an automatically or manually controlled valve 35 on the tube 25.

After the forming punch 21 has reached a position where, for example, the blank bridges protuberances 22*a* and 22*b*, the re-entrant zone 23*a* will be closed off from atmosphere and the suction will draw that bridging portion of sheet material snugly into the re-entrant position, as shown in Fig. 3. Upon further downward movement of the forming punch, the material will bridge, for example, between protuberances 22*b* and 22*c* and the suction will draw that bridging portion of the material snugly into the re-entrant position shown in Fig. 2, thus completing the forming operation. Thereafter, the formed article, when it has resolidified to a state where it may be safely handled, is severed from the unused portion of the blank by shearing portions of the forming punch cooperating with flange 33 shown in one form in Fig. 5, or it may be separated at a later stage.

Stripping of the formed article from the forming punch is preferably done after the suction has been released, and may be accomplished by stripping means incorporated in the forming punch, e. g., plungers or stripping rings; or by applying air pressure through tube 25, chamber 24 and apertures 31 and 32 to blow the article off the forming punch.

A continuous production arrangement is illustrated in Fig. 5 wherein the forming punch 21 is shifted by hand, or by any suitable means (not illustrated) from the forming position to a shearing position (shown dotted), the plastic or similar material being fed from a reel 40 into a punch press 42, shown schematically, through some suitabel heating means 41 where the plastic or similar material is heated to the proper ductile state so that forming may take place without cracking. The punch press 42 is shown as comprising members 44, 45, and 46 cooperating with the forming punch during the forming and shearing operations, and guide means in which the forming punch is arranged to be laterally shiftable, the guide means comprising suitable frame members 47, guide bars 48 and 49 supported by said frame members 47, and a guide block 50 movable between the guide bars through which the piston rod 27 is arranged to move. It will be understood that the guide frame comprising members 47, 48, and 49 is stationary and that the forming punch is moved within the guide frame by hand or by any suitable means. The forming punch holder 52 to which rod 27 is fastened is provided with two ring flanges 53 and 54, the ring flange 53 acting as one bearing surface for springs 55, the other ends of which bear against an inwardly directed ring flange 56 forming part of a circular clamping and stripping ring 57 and overlying the ring flange 54, the ring flange 56 being forced against the ring flange 54 by springs 55. The forming punch holder 52 is provided with a suction chamber and means for producing suction therein in a manner similar to that illustrated in Figs. 1 and 3, such suction means being manually or automatically operable in proper sequence. When the forming punch is forced downwardly, the lower edge 60 of the clamping ring 57 holds the plastic material firmly against the members 44 and 45 after which continued downward movement of the forming punch brings the forming punch into contact with the plastic material and deforms it into a cupped structure with the cooperation of suitable suction as described in connection with Fig. 2. After completing the formation of the cupped structure, the forming punch 21 is retracted, the sheet of plastic being carried along with the die since no shearing of the cupped formation has occurred and the suction is maintained during the retraction, the springs 55 not being of sufficient strength to force the sheet of plastic material away from the forming punch against the suction force. After the forming punch has been completely retracted, suitable means are brought into operation to shift the forming punch laterally in the guide bars 48 and 49 to the shearing position shown dotted in Fig. 5, carrying the cupped formation along with it and thus feeding the plastic sheet into the press. In the shifted position the forming punch again moves downward and during this movement the edge 61 of the flange ring 54 cooperates with the edges 62 and 63 of members 45 and 46, respectively, to shear the cup from the plastic strip as the lower outside edge 61 of the ring 54 passes the edges 62 and 63, while compressed air is supplied through the suction pipe 25 to eject or blow off the completed cup, following which the forming punch is again retracted, during which movement the clamping ring 57 prevents the remainder of the plastic strip from moving with the forming punch. After retraction following the shearing movement, the forming punch is moved to its initial position to begin a new series of operations.

In practice, I have found that material varying in thickness from 0.002 inch to .500 inch may be formed by the apparatus and method described, and by using a vacuum ranging from five inches to twenty-nine inches of mercury. Ductilizing temperature or other ductilizing treatment would depend upon the thickness of the material, its chemical nature and the shape of the article to be formed.

Any suitable material may be used for the ductile sheet, such as cellulose acetate, ethyl cellulose, and various other plastics, or the like.

Further modifications will be apparent to those skilled in the art, and it is desired, therefore, that the invention be limited only by the scope of the appended claims.

Having thus described my invention, what I claim and desire to secure by Letters Patent is:

1. A method of forming a ductile sheet of material into a form including protuberances interspaced with indentations which comprises anchoring said sheet during the forming operation at an unformed portion thereof, effecting relative movement between said anchored sheet and a forming punch having corresponding protuberances and indentations thereagainst until at least part of the material is bridging a pair of protuberances to form a closed chamber between said protuberances and the face of the forming punch, and then applying suction to the chamber to suck said bridging portion of the material against the face of the forming punch, then continuing the movement of the forming punch to cause another part of the material to bridge a pair of protuberances to form another closed chamber as aforesaid and applying suction to the chamber as aforesaid.

2. A method of forming a ductile sheet of material into a form including protuberances interspaced with indentations which comprises anchoring said sheet during the forming operation at an unformed portion thereof, effecting relative movement between said anchored sheet and a forming punch having corresponding protuberances and indentations thereagainst to cause the protuberances to engage the sheet and cause the sheet to bridge over the indentations, and at a predetermined time in the cycle of movement of said forming punch applying suction between the working surface of said forming punch and said sheet in zones wherein said indentations in said sheet are desired.

3. Apparatus for forming a ductile sheet of plastic material into a cupped formation comprising supporting means for holding the portion of the sheet adjacent the portion to be cupped against lateral slipping, a reciprocable forming punch movable transversely against a portion of the sheet to be cupped, means associated with said forming punch for applying suction to the cupped portion of the sheet during the forming punch applying and withdrawing movement while the sheet is still held by said holding means to suck the sheet against the forming punch surface during the forming movement and to hold it against the forming punch during the withdrawing movement and guide means for mounting said forming punch for lateral shifting movement with respect to said supporting means.

4. In the art of successively forming articles from thermoplastic sheet material by the use of forming means having a forming surface directly engageable with the sheet material, a method of forming a ductile sheet of material into a form including protuberances interspaced with indentations which comprises anchoring said sheet during the forming operation at an unformed portion thereof, effecting relative movement between said anchored sheet and a forming punch having corresponding protuberances and indentations thereagainst until at least part of the material is bridging a pair of protuberances to form a closed chamber between said protuberances and the face of the forming punch, then applying suction to the chamber to suck said bridging portion of the material against the face of the forming punch, and effecting the separation of the formed sheet from the face of the forming punch.

5. In the art of successively forming articles from thermoplastic sheet material by the use of forming means having a forming surface directly engageable with the sheet material, a method of forming a ductile sheet of material into a form including protuberances interspaced with indentations which comprises anchoring said sheet during the forming operation at an unformed portion thereof, heating the sheet to a ductilizing temperature, effecting relative movement between said anchored sheet and a forming punch having corresponding protuberances and indentations thereagainst until at least part of the material is bridging a pair of protuberances to form a closed chamber between said protuberances and the face of the forming punch, then applying suction to the chamber to suck said bridging portion of the material against the face of the forming punch, and effecting the separation of the formed sheet from the face of the forming punch, said sheet material after heating being moved in heated ductile condition into position for co-operation with said forming punch.

6. In the art of successively forming articles from thermoplastic sheet material by the use of forming means having a forming surface directly engageable with the sheet material, a method for forming a ductile sheet of plastic material into a cupped formation having spaced protuberant surfaces and a re-entrant surface between said protuberant surfaces comprising holding the portion of the sheet around the portion to be cupped against lateral slipping, effecting relative movement between said held sheet and forming means having protuberant surfaces for forming the protuberant surfaces in a cupped formation, and a re-entrant surface between said protuberant surfaces, transversely against said sheet to form the protuberant surfaces on the sheet and cause the sheet to bridge over the re-entrant surface, exhausting the air from the space between the re-entrant surface and the sheet to cause the sheet to be forced against the re-entrant surface, and effecting separation of the formed sheet from said protuberant and re-entrant surfaces.

7. In the art of successively forming articles from thermoplastic sheet material by the use of forming means having a forming surface directly engageable with the sheet material, a method for forming a ductile sheet of plastic material into a cupped formation having spaced protuberant surfaces and a re-entrant surface between said protuberant surfaces comprising heating the sheet to a ductilizing temperature, holding the portion of the sheet around the portion to be cupped against lateral slipping, effecting relative movement between said held sheet and forming means having protuberant surfaces for forming the protuberant surfaces in a cupped formation, and re-entrant surface between said protuberant surfaces, transversely against said sheet to form the protuberant surfaces on the sheet and cause the sheet to bridge over the re-entrant surface, exhausting the air from the space between the re-entrant surface and the sheet to cause the sheet to be forced against the re-entrant surface, and effecting separation of the formed sheet from said protuberant and re-entrant surfaces, said sheet material after heating being moved in heated ductile condition into position for co-operation with said forming means.

8. In the art of successively forming articles from thermoplastic sheet material by the use of forming means having a forming surface directly engageable with the sheet material, a method for forming a ductile sheet of plastic material into a cupped formation having spaced protuberant surfaces and a re-entrant surface between said protuberant surfaces comprising heating the sheet to a ductilizing temperature, holding the portion of the sheet around the portion to be cupped against lateral slipping, effecting relative movement between said held sheet and forming means having protuberant surfaces for forming the protuberant surfaces in a cupped formation, and a re-entrant surface between said protuberant surfaces, transversely against said sheet to form the protuberant surfaces on the sheet and cause the sheet to bridge over the re-entrant surface to form a chamber closed except for the exhaust of air therefrom, exhausting the air from the space between the re-entrant surface and the sheet to cause the sheet to be forced against the re-entrant surface, and effecting separation of the formed sheet from said protuberant and re-entrant surfaces, said sheet material after heating being moved in heated ductile condition into position for co-operation with said forming means.

GUSTAVE W. BORKLAND.

No references cited.